(12) United States Patent
Shimada et al.

(10) Patent No.: US 6,257,387 B1
(45) Date of Patent: Jul. 10, 2001

(54) HYDRAULIC POWER TRANSMISSION JOINT

(75) Inventors: Kazuhisa Shimada; Tadahiko Kato; Kiyonori Hirao, all of Shizuoka; Toshiharu Takasaki, Kanagawa; Hirotaka Kusukawa, Machida; Shigeo Murata, Kanagawa, all of (JP)

(73) Assignees: Fujiunivance Co., Kosai; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/556,841

(22) Filed: Apr. 21, 2000

(30) Foreign Application Priority Data

Apr. 26, 1999 (JP) .................................................. 11-117912

(51) Int. Cl.$^7$ .................................................. F16D 31/00
(52) U.S. Cl. .............................................. 192/59; 464/27
(58) Field of Search .................................. 192/59, 103 F; 464/27

(56) References Cited

U.S. PATENT DOCUMENTS 4,597,483 * 7/1986 Porel et al. ............................ 192/59
5,103,642 * 4/1992 Suzuki et al. ....................... 192/59 X
5,297,994 * 3/1994 Suzuki et al. ....................... 192/59 X
5,320,586 * 6/1994 Baxter, Jr. ......................... 192/59 X \* cited by examiner Primary Examiner—Charles A Marmor
Assistant Examiner—Saúl Rodríguez
(74) Attorney, Agent, or Firm—Wenderoth, Lind & Ponack, L.L.P.

(57) ABSTRACT

A plunger is accommodated in each of a plurality of plunger chambers formed axially in a rotor, with the plunger being displaced by rotation of a cam face associated with a housing. A first one way valve for intake is incorporated in the head of each plunger and a second one way valve for discharge is disposed within in a discharge hole leading to the plunger chambers. The intake stroke of the plunger caused by rotation of the cam opens the first one way valve to suck oil from a low pressure chamber into the plunger chamber. The discharge stroke of the plunger opens the second one way valve to allow the discharged oil to flow through the orifice into the low pressure chamber, whereby a torque corresponding to the relative rotational-speed difference is transmitted from the housing side to the rotor side.

5 Claims, 4 Drawing Sheets

HYDRAULIC POWER TRANSMISSION JOINT

BACKGROUND OF THE INVENTION

1. Field of the Invention

The present invention relates generally to a hydraulic power transmission joint for use in the distribution of a vehicle driving force and, more particularly, to a hydraulic power transmission joint rendering its unit lightweight and compact.

2. Description of the Related Arts

Conventional hydraulic power transmission joints are arranged, for example, between a propeller shaft associated with the front differential gear and the rear differential gear, to transmit a torque corresponding to the rotational-speed difference between the input and output shafts. Such hydraulic power transmission joints can include an oil pump type hydraulic transmission joint in which the rotation of a cam having recessed and raised portions thrust the plunger or the vane to displace oil. In the oil pump type hydraulic transmission joint, the oil must be discharged when the cam is in its descending stoke but sucked when it is in its ascending stroke. One way valves are therefore needed in order to prevent a reverse flow of oil from the high pressure chamber upon the intake as well as an oil leakage into the low pressure chamber upon the discharge.

One example of such a hydraulic power transmission joint equipped with one way valves is described in Japan Patent No. 98-164628. FIG. 1 is a sectional view of the joint disclosed in Japan Patent No. 98-164628, and FIGS. 2A and 2B are explanatory diagrams of operations of FIG. 1 joint. In FIGS. 1, 2A and 2B, a rotor 101 has a plurality of grooves formed in its outer peripheral portion. Each groove receives a vane 102 slidably inserted thereinto. To effect the function as a hydraulic pump, the relative rotations between a cam ring 103 and the rotor 101 cause a generation of hydraulic pressure within pump chambers 104, 105 and 106. The discharge ports of the pump chambers 104, 105 and 106 are blocked so that the rotor 101 and cam ring 103 can rotate jointly like one rigid body by the hydrostatic pressure. Intake/discharge ports 111, 112 and 113 serve as intake ports or discharge ports depending on the direction of rotations of the vanes 102 and communicate mutually with a first oil passage 114. Similarly, intake/discharge ports 107, 108 and 109 serve as intake ports or discharge ports by the action of the vanes 102 and communicate mutually with a second oil passage 110. The intake/discharge ports 111, 112 and 113 resulting in the intake ports or the discharge port at one time communicate with one another through the first oil passage 114. The first oil passage 114 connects with the second oil passage 110 by way of check valves 120 and 121 acting as one way valves. When the vanes 102 relatively rotate counterclockwise as in FIG. 2A for example, the check valve 120 is closed to separate the high pressure side from the low pressure side while simultaneously the check valve 121 is opened allowing a communication with the high pressure side. As a result, the discharge ports of the pump chambers 104, 105 and 105 are blocked to generate a hydrostatic pressure, the thus confined oil causing the rotor 101 and the cam ring 103 to rotate jointly like one rigid body, for torque transmission. On the contrary, when the vanes 102 relatively rotate clockwise, the check valve 121 is closed to separate the high pressure side from the low pressure side, while simultaneously the check valve 120 is opened to allow a communication with the high pressure side. In consequence, the discharge ports of the pump chambers 104, 105 and 106 are blocked to generate a hydrostatic pressure, the thus confined oil causing the rotor 101 and the cam ring 103 to rotate jointly like one rigid body, for torque transmission. The first oil passage 114 and the second oil passage 110 open to an oil reservoir 115 by way of check valves 116 and 117 serving as one way valves permitting only the flow from the oil reservoir 115. Such a hydraulic pressure circuit allows an action of discharge pressure proportional to the rotational speed at all times, irrespective of the direction of the relative rotations.

A cover 118 of FIG. 1 includes a passage 119 for allowing an action of high pressure for thrusting up the vanes from annular recessed grooves provided in the rotor side surfaces, the passage 119 communicating with the intake/discharge ports 111, 112, 113, 107, 108 and 109 of FIGS. 2A and 2B. The discharged high pressure oil is allowed to circulate through orifices 122 and 123 communicating with each other of the first and second oil passages 114 and 110. Check vales 120 and 121 are further incorporated for the constant action of high pressure on the bottoms of the vanes. The two check valves 120 and 121 serve to prevent any reverse flow of oil from the high pressure side through the intake passage as well as any oil leakage to the low pressure side through the discharge passage.

However, such a conventional hydraulic power transmission joint needs four one way valves which are incorporated in the both side cover portions making up the hydraulic chamber of the vane pump, with the result that a wider accommodation space is required and thus the cost itself also increases. Furthermore, the oil passage tends to become longer since the discharge ports and the intake ports of a plurality of hydraulic chambers are allowed to communicate with two check valves in common. In particular, an elongated intake path may bring about a defective intake due to the oil line resistance, and if the oil viscosity is high at the low temperature, the vanes or the plungers may fail to follow up, result in an occurrence of foreign noises.

Such a one way valve problem will apply similarly to the case of use of the one way valve in the hydraulic power transmission joint having a structure where the rotation of the cam thrusts the plungers in the axial direction to displace the oil, as in U.S. Pat. Nos. 5,706,658 and 5,983,635.

SUMMARY OF THE INVENTION

The present invention provides a hydraulic power transmission joint ensuring an increased degree of freedom in the arrangement of the plunger and achieving a lightweight and compact unit, as well as capable of preventing the occurrence of foreign noises due to a reduction of the oil intake resistance.

The present invention is directed to a hydraulic power transmission joint disposed between input and output shafts that are capable of relative rotations and adapted to transmit torque corresponding to a rotational-speed difference between the input and output shafts, the joint comprising a housing coupled to one of the input and output shafts and having a cam face formed on its inner side surface; a rotor coupled to the other of the input and output shafts and adapted to be rotatably accommodated in the housing, the rotor having a plurality of plunger chambers formed in the axial direction thereof; a plurality of plungers each being accommodated in each of the plurality of plunger chambers in a reciprocative manner under a biasing force of a return spring, the plungers being axially displaced by the cam face upon relative rotations of the input and output shafts; a discharge hole formed in the rotor and communicating with the plurality of plunger chambers; and a valve block having a high pressure chamber leading to the discharge hole, the valve block having an orifice adapted to generate a flow resistance by the flow of oil displaced by the action of the plungers.

The hydraulic power transmission joint having such a structure is characterized by the present invention in that it comprises a first one way valve for intake disposed in each of intake holes formed in the heads of the plurality of plungers, the first one way valve being adapted to open when each plunger is in its intake stroke but to close when it is in its discharge stroke; and a second one way valve for discharge disposed in each of discharge holes leading to the plurality of plunger chambers, the second one way valve being adapted to open when the plunger is in its discharge stroke but to close when it is in its intake stroke.

The intake hole at the plunger head incorporating the first one way valve communicates with a low pressure chamber inside the housing, and the discharge hole provided with the second one way valve communicates through the orifice of the valve block with the low pressure chamber. The first one way valve is in the form of a ball valve disposed in a conical hole opening to the intake hole in the plunger head, the open position of the ball valve being determined by a retainer of the spring that urges the plunger. The second one way valve is in the form of a ball valve disposed in a conical hole formed in the opening of the discharge hole leading to the plunger chamber, the open position of the ball valve being determined by a restriction member arranged in a high pressure chamber formed in the valve block. The housing is coupled to the input shaft and the rotor is coupled to the output shaft.

According to the thus constructed hydraulic power transmission joint of the present invention, the first one way valve for intake is provided in the head of the plunger and the second one way valve for discharge is provided inside the rotor discharge hole, with the result that the oil path is shortened that extends through the low pressure chamber, the plunger chamber, the high pressure chamber, the orifice and the low pressure chamber in a circulative manner. In particular, shortening of the inflow path contributes to a reduction of oil intake resistance, with no occurrence of jumping of plunger at low temperature and to the prevention of occurrence of foreign noises. The arrangement of the two one way valves substantially integrated with the plunger also contributes to an increase in the degree of freedom of arrangement of the plunger with a reduction in the restriction on the space, resulting in acquisition of a lightweight and compact joint.

The above and other objects, aspects, features and advantages of the present invention will become more apparent from the following detailed description when read in conjunction with the accompanying drawings.

DETAILED DESCRIPTION OF THE PREFERRED EMBODIMENT

Figure 1:
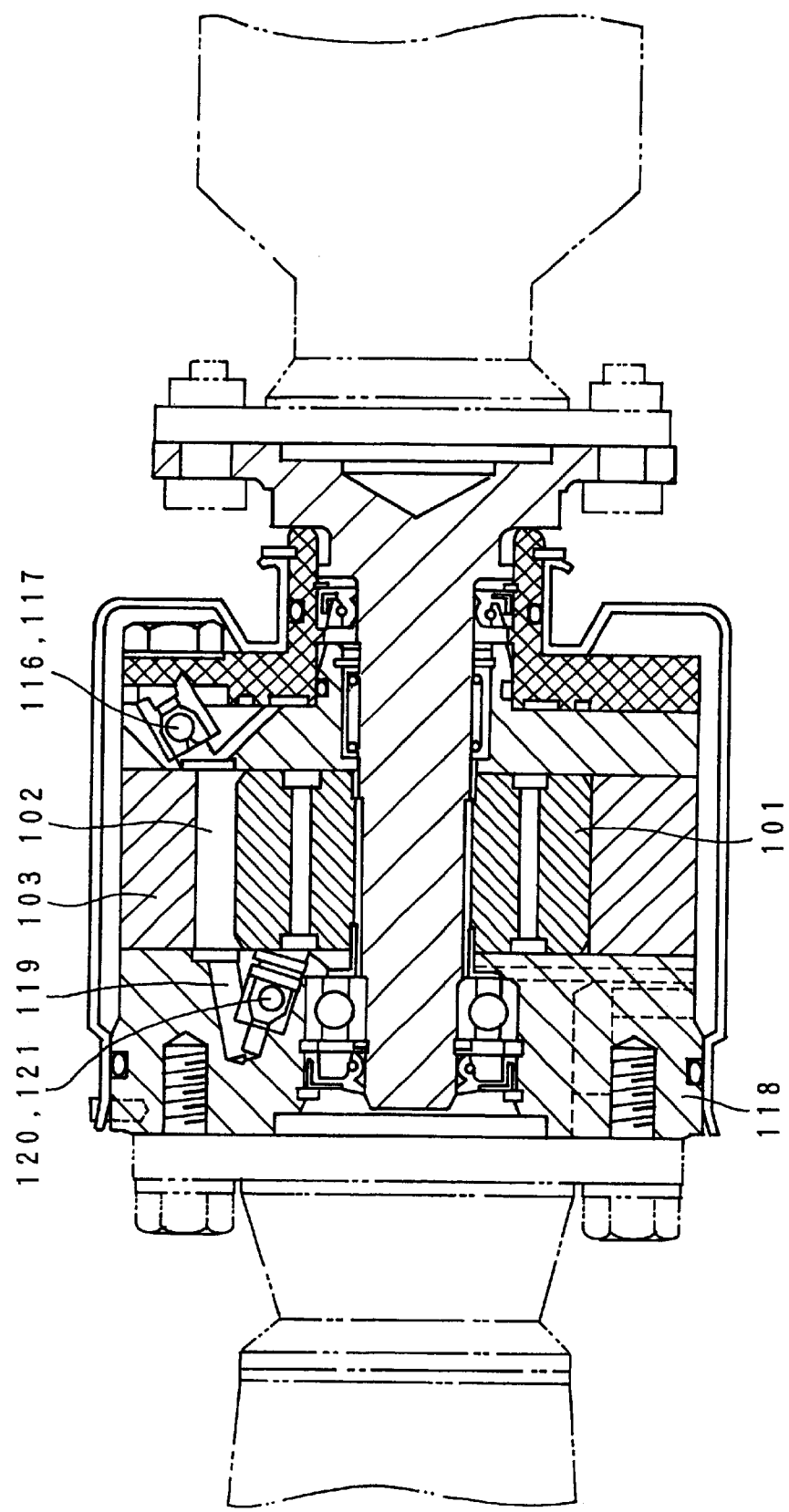
FIG. 1 is a sectional view of a conventional hydraulic power transmission joint using a vane pump.
Figure 2A:
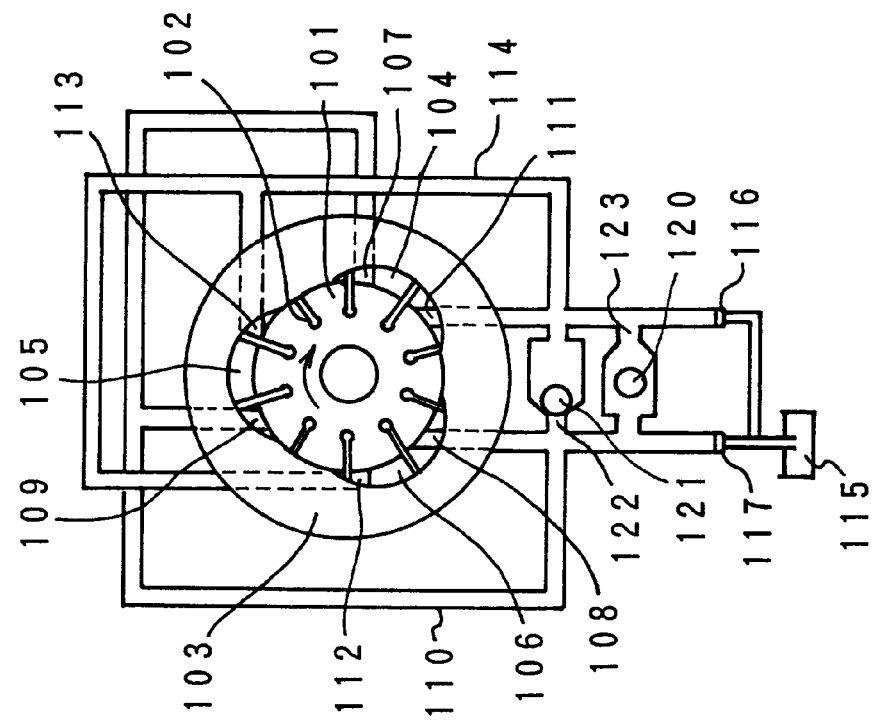
FIGS. 2A and 2B are explanatory views of actions of the joint of FIG. 1.
Figure 2B:
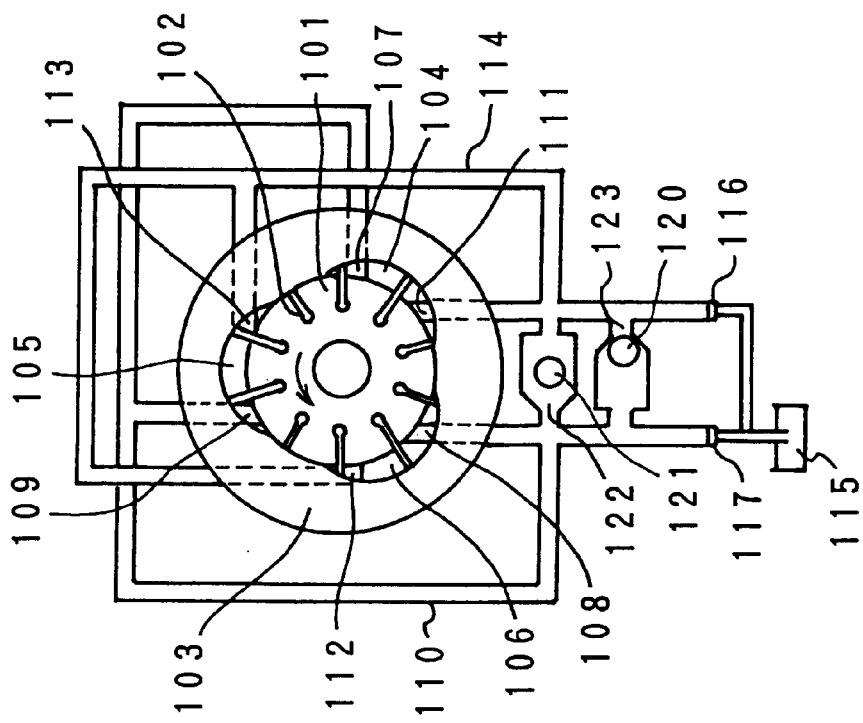
Figure 3:
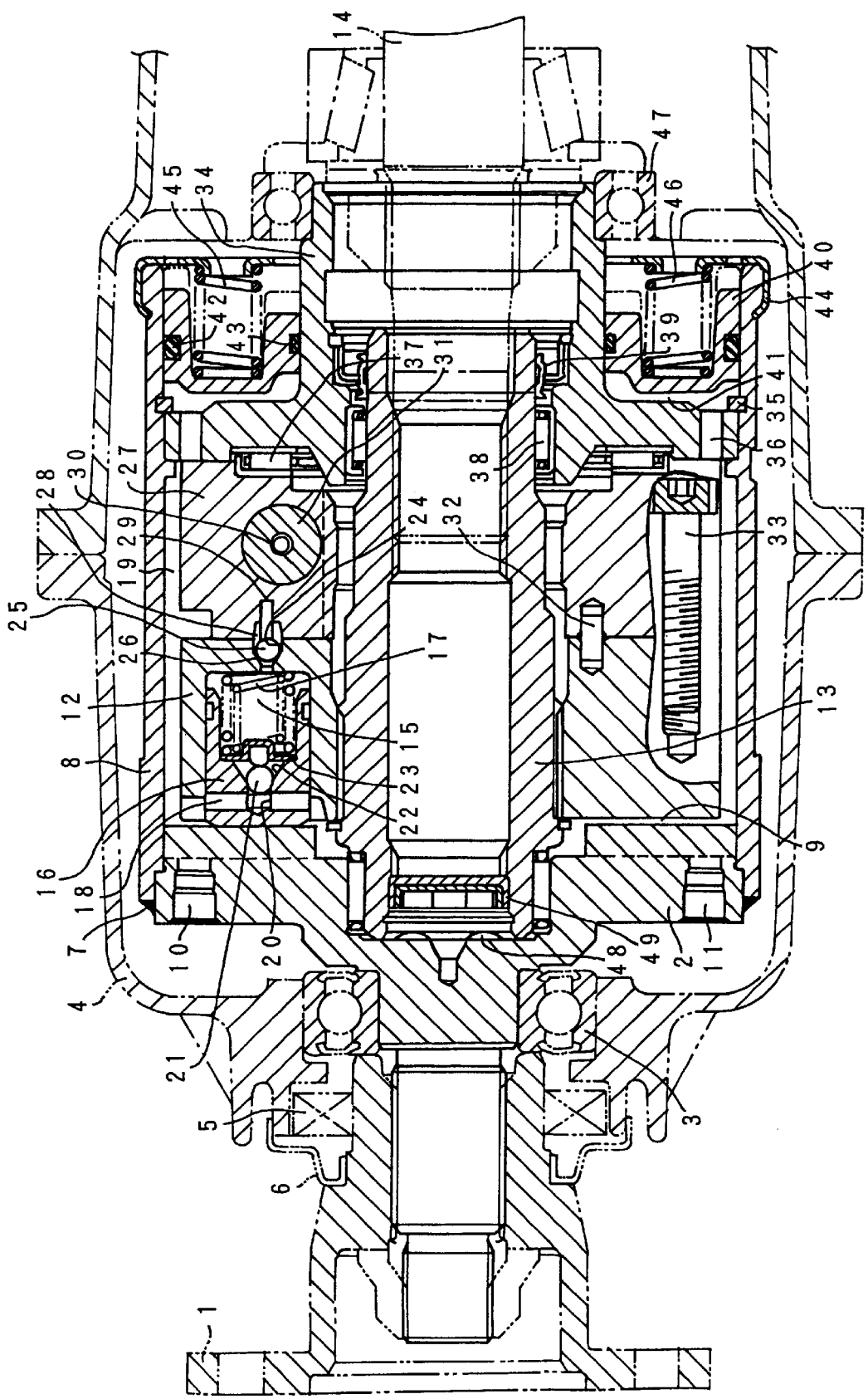
FIG. 3 is a sectional view of a hydraulic power transmission joint in accordance with one embodiment of the present invention.
Figure 4:
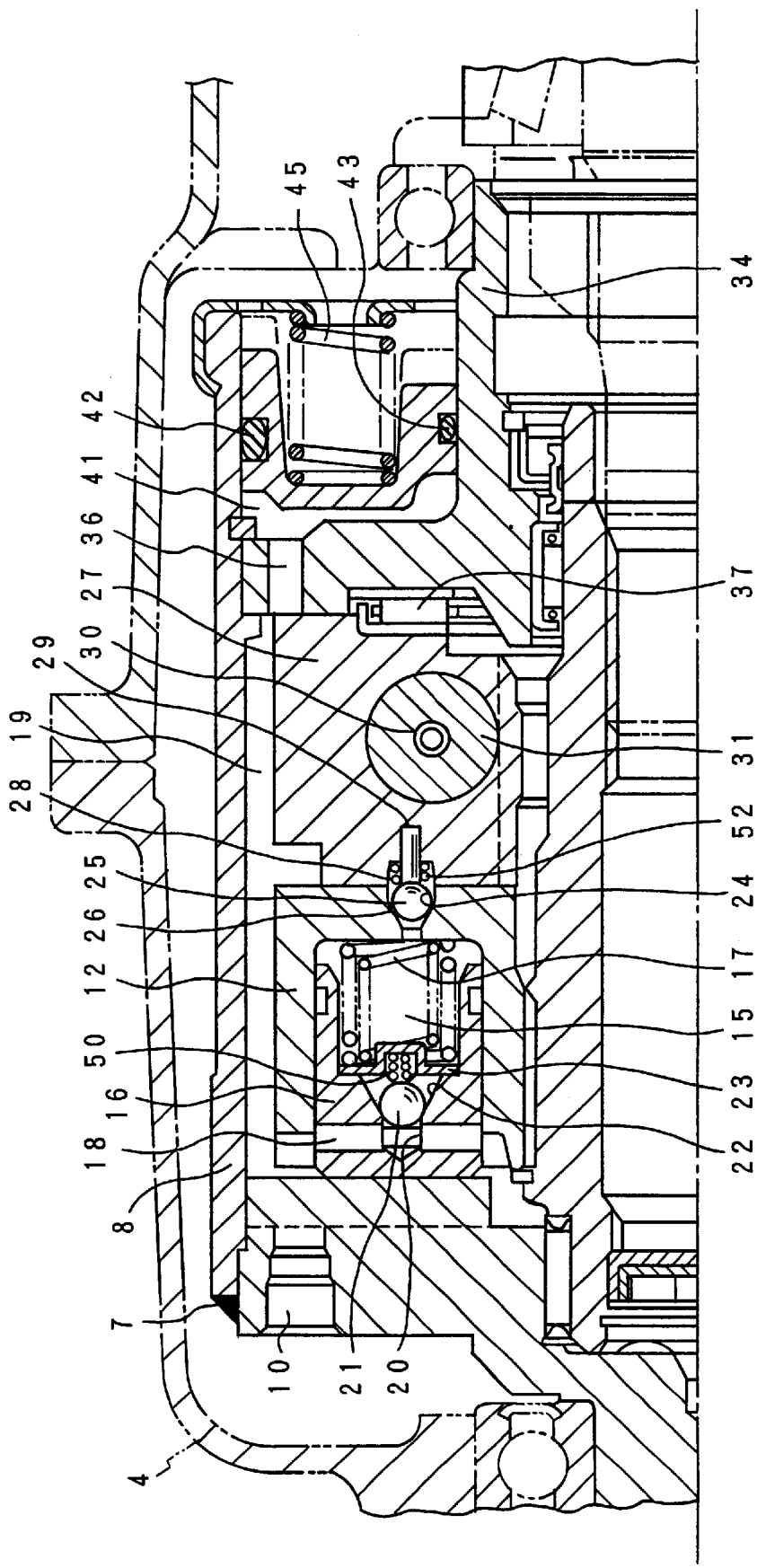
FIG. 4 is a half sectional view of the principal part of the joint of FIG. 3 in an enlarged scale.

FIG. 3 is a sectional view of an embodiment of the present invention, of which principal part is shown in FIG. 4 in an exclusively enlarged manner. In FIGS. 3 and 4, a companion flange 1 is linked to a propeller shaft acting as an input shaft from the front differential gear. A housing shank 2 is inserted for spline coupling into the interior of the companion flange 1. The housing shank 2 has at its outer periphery a front bearing 3 by way of which the housing shank 2 is supported on a differential gear case 4. Disposed between the differential gear case 4 and the companion flange 1 are a sealing member 5 and a cover 6 that in cooperation serve to prevent any possible invasion of dusts or other foreign particles and outflow of differential gear oil. A housing 8 is firmly secured via a weld 7 to the housing shank 2 that includes on its inner side a cam face 9 having two or more raised portions. The cam face 9 allows the housing shank 2 to function as a cam. The housing shank 2 is further provided with plugs 10 and 11 for injecting oil into the interior of the joint or for discharging oil therefrom. A rotor 12 is rotatably housed inside the housing 8 and is engaged with a main shaft 13 acting as an output shaft, for integral rotations with the main shaft 13. The main shaft 13 receives a gear shaft 14 of a drive pinion gear provided on the rear differential gear so that the main shaft 13 can rotate jointly with the drive pinion gear. The rotor 12 is formed with a plurality of axially extending plunger chambers 15 inside which a plurality of plungers 16 are slidably accommodated by way of return springs 17. The number of the plungers depends on the size of the rotor and can vary within a range of four to ten for example, but is preferably seven for example.

The plunger 16 includes near its head an intake passage 18 that communicates with a low pressure chamber 19. The intake passage 18 and the plunger chamber 15 communicate with each other through a communication hole 20 that is provided with a first one way valve 21 for intake in the form of a ball valve. A conically opened valve seat 22 is formed in the interior of the plunger chamber 15 so that the one way valve 21 is seated on the valve seat 22. The opening of the valve seat 22 is provided with a check plug 23. A check spring 50 is interposed between the check plug 23 and the first one way valve 21, for biasing and positioning the one way valve 21. The return spring 17 intervenes between the check plug 23 and the bottom of the rotor 12.

A discharge hole 24 is formed in the rotor 12, for communication with the plunger chamber 15. The discharge hole 24 is provided with a second one way valve 25 for discharge in the form of a ball. That is, a conically opened valve seat 26 is formed in the discharge hole 24 so that the one way valve 25 is seated on the valve seat 26. A valve block 27 follows the rotor 12 and is formed with a high pressure chamber 28 that communicates with the discharge hole 24 in the rotor 12. A restriction member 29 protrudes into the high pressure chamber 28, for positioning the second one way valve 25 so as to allow its open position to be at a predetermined position. The valve block 27 is provided with an orifice member 31 having an orifice 30 by way of which the high pressure chamber 28 leads to the low pressure chamber 19. The valve block 27 and the rotor 12 are positioned by a pin 32 relative to each other and are firmly fastened together by means of a bolt 33.

When the plunger 16 is in its intake stroke for leftward displacement, the first one way valve 21 for intake at the heat of the plunger 16 is opened, allowing oil to enter the plunger chamber 15 through the low pressure chamber 19, the intake passage 18 and the communication hole 20. At that time, the second one way valve 25 for discharge at the discharge hole 24 in the rotor 12 remains closed and thereby prevents a reverse flow of oil from the high pressure chamber 28. When the plunger 16 is in its discharge stroke for rightward displacement, the second one way valve 25 for discharge is opened, allowing oil within the plunger chamber 15 to flow through the discharge hole 24 and the high pressure chamber 28 into the orifice and thence to the low pressure chamber 19. At that time, the one way valve 21 for intake remains closed and thereby prevents a leakage of oil through the communication hole 20 and the intake passage 18 into the low pressure chamber 19.

A bearing retainer 34 follows the valve block 27. The bearing retainer 34 is fixedly press-fitted at its outer periphery to the housing 8 and is positioned by means of a snap ring 35. The bearing retainer 34 rotates jointly with the housing 8. The bearing retainer 34 is formed with a through-hole 36 that allows a communication between an accumulator chamber 41 associated with an accumulator piston 40 and the low pressure chamber 19. Needle bearings 37 and 38 are interposed between the bearing retainer 34 and the valve block 27 and between the bearing retainer 34 and the main shaft 13, respectively. An oil seal 39 is also provided between the bearing retainer 34 and the main shaft 13 and thereby prevents any possible outflow of oil.

The accumulator piston 40 following the bearing retainer 34 defines an accumulator chamber 41 and absorbs a variance in volume arising from oil expansion and contraction induced by heat. To prevent any oil leakage, O-rings 42 and 43 are interposed between the accumulator piston 40 and the housing 8 and between the accumulator piston 40 and the bearing retainer 34, respectively. The accumulator piston 44 is firmly secured at its outer peripheral end to the housing 8. Return springs 45 and 46 intervene between an accumulator retainer 44 and the bottom of the accumulator piston 40. The bearing retainer 34 has an extension whose outer periphery is provided with a rear bearing 47 by way of which the bearing retainer 34 is supported on the differential gear case 4. The opening of the main shaft 13 is further provided with a lubricant groove 48 and a sealing member 49.

Operations will then be described. When no rotational-speed difference occurs between the housing shank 2 having the cam face 9 and the rotor 12, the plunger 16 remains immovable so that any torque is not transmitted. At that time, the plunger 16 is pressed against the cam face 9 by the return spring 17. Once any rotational-speed difference occurs between the housing shank 2 and the rotor 12, the plunger 16 in its discharge stroke is thrust axially by the cam face 9 of the housing shank 2, for rightward displacement. At that time, oil residing within the plunger chamber 15 presses the second one way valve 25 for discharge seated on the valve seat 26 at the discharge hole 24 in the rotor 12, to open the discharge hole 24 and thus enter the high pressure chamber 28 in the valve block 27. At that time, the first one way valve 21 for intake remains seated on the valve seat 22 in the plunger chamber 15 to thereby close the communication hole 20. This prevents oil within the plunger chamber 15 from leaking through the intake passage 18 to the low pressure chamber 19. Oil displaced into the high pressure chamber 28 is fed through the orifice 30 from the low pressure chamber 19 into the intake passage 18. At that time, the hydraulic pressure will rise in the high pressure chamber 28, the discharge hole 24 and the plunger chamber 15 due to the resistance of the orifice 30, consequently giving birth to a reaction force of the plunger 16. The housing shank 2 is rotated against this plunger reaction force so that a torque is transmitted between the housing shank 2 and the rotor 12.

Further rotations of the housing shank 2 cause the intake stroke to provide a leftward displacement to the plunger 16. At that time, the first one way valve 21 for intake opens the communication hole 20, with the result that oil within the low pressure chamber 19 is allowed to flow through the intake passage 18 and the communication hole 20 into the plunger chamber 15, causing the plunger 16 to return along the cam face 9 of the housing shank 2. At the same time, the second one way valve 25 for discharge is closed to prevent oil within the high pressure chamber 28 from reversely flowing into the plunger chamber 15.

In the present invention, the first one way valve 21 for intake is incorporated in the plunger 16 itself, with the one way valve for discharge 25 being arranged, one for each plunger 16, in the discharge hole 24 formed in the bottom of the rotor 12 that accommodates the plunger 16, thereby achieving an increase in the degree of freedom of design for the arrangement of the plunger 16, as well as achieving a reduced restriction on the accommodation space to acquire a lightweight and compact joint.

Furthermore, by virtue of the structure in which the plunger 16 is provided at its head with the communication hole 20 leading to the intake passage 18, with the first one way valve 21 for intake that opens or closes the communication hole 20, the intake path will be shortened and the oil intake resistance will also be reduced, whereby any defective intake at the lower temperature will be eliminated with no occurrence of foreign noises arising from jumping of the plunger 16 which may be caused by the defective intake at the low temperature.

According to the present invention, as set forth hereinabove, the first one way valve for intake is provided in the head of the plunger and the second one way valve for discharge is provided inside the rotor discharge hole, with the result that the intake path is shortened to reduce the oil intake resistance so that any plunger jumping at the low temperature and attendant foreign noises will not occur. Simultaneously, an increased degree of freedom in the disposition of the plunger and a decreased restriction on the space is achieved and a lightweight and compact joint is obtained.

The present invention is to be construed as including any appropriate variants without impairing the objects and advantages thereof. The present invention is not restricted by any numerical values indicated in the embodiment.

What is claimed is:

1. A hydraulic power transmission joint disposed between input and output shafts that are capable of relative rotations and adapted to transmit torque corresponding to a rotational-speed difference between said input and output shafts, said joint comprising:

a housing coupled to one of said input and output shafts and having a cam face formed on its inner side surface;

a rotor coupled to the other of said input and output shafts and adapted to be rotatably accommodated in said housing, said rotor having a plurality of plunger chambers formed in the axial direction thereof;

a plurality of plungers each being accommodated in each of said plurality of plunger chambers in a reciprocative manner under a biasing force of a return spring, said plungers being axially displaced by said cam face upon relative rotations of said input and output shafts;

a discharge hole formed in said rotor and communicating with said plurality of plunger chambers;

a valve block having a high pressure chamber leading to said discharge hole, said valve block having an orifice adapted to generate a flow resistance by the low of oil displaced by the action of said plungers;

a first one way valve for intake disposed in each of intake holes formed in the heads of said plurality of plungers, said first one way valve being adapted to open when each plunger is in its intake stroke but to close when it is in its discharge stroke; and a second one way valve for discharge disposed in each of discharge holes leading to said plurality of plunger chambers, said second one way valve being adapted to open when said plunger is in its discharge stroke but to close when it is in its intake stroke.

2. A hydraulic power transmission joint according to claim 1, wherein said intake hole at the plunger head incorporating said first one way valve communicates with a low pressure chamber inside said housing, and wherein said discharge hole provided with said second one way valve communicates through said orifice of said valve block with said low pressure chamber.

3. A hydraulic power transmission joint according to claim 1, wherein said first one way valve is in the form of a ball valve disposed in a conical hole opening to said intake hole in said plunger head, the open position of said ball valve being determined by a retainer of said spring that urges said plunger.

4. A hydraulic power transmission joint according to claim 1, wherein said second one way valve is in the form of a ball valve disposed in a conical hole formed in the opening of said discharge hole leading to said plunger chamber, the open position of said ball valve being determined by a restriction member arranged in a high pressure chamber formed in said valve block.

5. A hydraulic power transmission joint according to claim 1, wherein said housing is coupled to said input shaft and said rotor is coupled to said output shaft.

* * * * *